United States Patent [19]

Perron et al.

[11] Patent Number: 5,312,551
[45] Date of Patent: May 17, 1994

[54] MOBILE MUD DEHYDRATOR

[75] Inventors: Jean-Noel Perron, Beauce Sud; Denis Veilleux, Beauceville, both of

[73] Assignees: Benoit Allard; Denix Lemieux, Quebec, Canada

[21] Appl. No.: 915,520

[22] Filed: Jul. 20, 1992

[30] Foreign Application Priority Data

Jul. 16, 1992 [CA] Canada ................. 2074065

[51] Int. Cl.⁵ .................................. C02F 1/56
[52] U.S. Cl. ................... 210/712; 210/732; 210/781; 210/798; 210/195.1; 210/196; 210/202; 210/241; 210/257.1; 210/258; 210/392; 210/393; 210/396
[58] Field of Search ............... 210/702, 710, 725, 727, 210/728-734, 781, 787, 791, 797, 798, 712, 106-108, 170, 195.1, 196, 202, 205, 241, 391, 392, 393, 396, 257.1, 258

[56] References Cited

U.S. PATENT DOCUMENTS

| | | | |
|---|---|---|---|
| 3,630,365 | 12/1971 | Woodbridge et al. | 210/241 |
| 4,578,198 | 3/1986 | Schmidt et al. | 210/241 |
| 4,867,879 | 9/1989 | Muller | 210/393 |

FOREIGN PATENT DOCUMENTS

| | | | |
|---|---|---|---|
| 3122412 | 6/1981 | Fed. Rep. of Germany | 210/241 |
| 2138494 | of 0000 | France | 210/241 |
| 2389576 | of 0000 | France | 210/241 |
| 0118023 | of 0000 | Japan | 210/241 |
| WO90/03474 | 4/1990 | PCT Int'l Appl. | 210/241 |

*Primary Examiner*—Peter A. Hruskoci

[57] ABSTRACT

A mobile multi reservoir unit aspirates liquid with solids from septic tanks, treats immediately the liquor by a flocculent polymer and dehydrates the product by a low speed vertical centrifugal machine; the liquid is returned to the septic tank and the solid is maintained in a mud stade, easy to rake off by a rotating folding knife, followed by transfer to a storage reservoir; a pump unit enacts the material transfer from and to each reservoir in succession by aspiration and by pressure build up.

9 Claims, 2 Drawing Sheets

MOBILE MUD DEHYDRATOR

The present invention is related to a mobile apparatus for treatment of septic tank contents and for concentrating the mud and solid matters thereof to facilitate transportation.

A review of the literature has revealed several patents found to be of interest:

WO 90/03474 Apr. 5, 1990, Larson (SE) shows a mobile dehydrator which utilizes suction to aspirate the liquids and a rotating screen to perform a separation: the operation lasts thirty minutes.

DE 3122412 Jun. 5, 1981, Gabler illustrates a pumping vehicle provided with two pumps of which one is a pressure pump for the liquid and the other is a suction pump for the liquid and the other is a suction pump for the paste: the system is limited by the capacity of the reservoir, about four septing tanks.

FR 2389576 May 5, 1977, Soc. Auxiliaire Entr. discloses a method for densifying polluted waters and which utilizes a screw conveyor.

FR 2138494 May 27, 1971, Hydrovide, Fr. utilizes a source of vacuum for mud separation.

JA 0118023 Sep. 13, 1979, Kokai, Jap. utilizes suction and a vibrating screw.

Keeping in mind the limitations of the prior art our first objective is to improve the treatment of septic tank contents by means of a mobile treatment apparatus which is to concentrate mud and solid matters while eliminating and returning clear filtrate to the original tank, thus permitting a regular truck to collect a fair number, such as twenty (20), of septic tank solid contents on a single trip and dispose of such solids at a certain distance. By septic tank contents we mean any particle contained in the clear liquid on top or as part of a denser substance found in the bottom.

More specifically the objectives are to provide a series of reservoirs mounted on a truck platform, and including a centrifugal machine, a pump and piping and comprising:

means of transportation by truck, means of pumping of a liquid with particules in suspension, means of treating including means of coagulating of solid particles, this treatment being preferably carried out while the liquid is in turbulence in transit, in a piping system of sufficient length for intimate contact with a chemical flocculating product such as a polymer solution, means of storing a volume equal to the sum of the volumes of the original septic tank plus the volume of any other liquid useful to mix with and coagulate the original liquid, means of vertical centrifuge of suitable capacity and of variable speed to cause separation of coagulated mud from filtrate liquid, means of returning liquid back to septic tank, means of removal of solid particules coagulated on wall of centrifuge, means of transfer of particules to a storage compartment, means of rinsing of vertical wall of centrifugal machine.

The residues from several septic tanks may be collected in a storage container and thereby reducing the space needed to store these wastes.

The above mentioned and other advantages of the invention will be better understood in reference to the following description and drawings in which:

Figure 1:
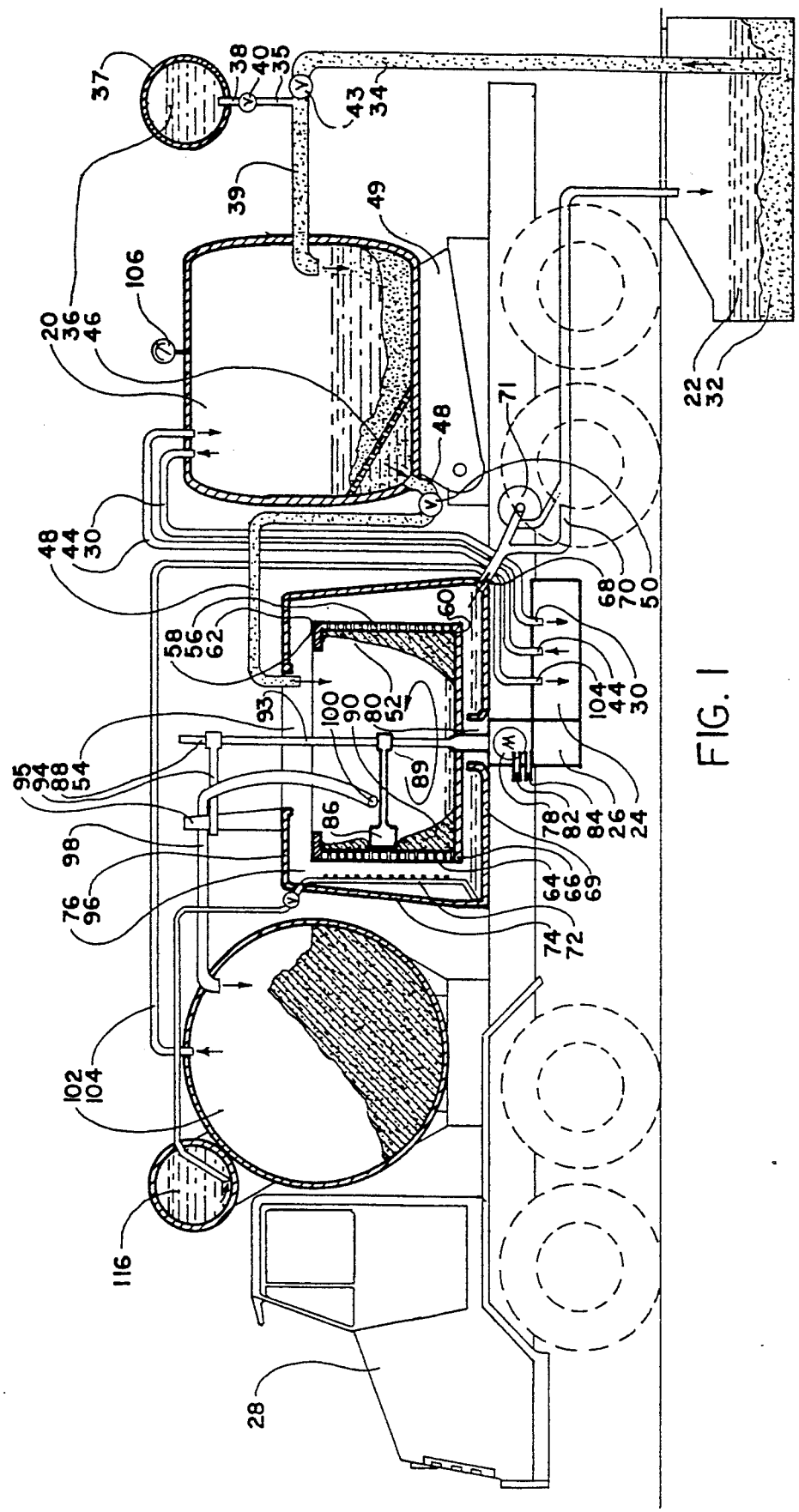
FIG. 1 is a view of the apparatus with all the parts.

Referring to the drawings wherein the same numbers refer to the same elements, the elements of the preferred embodiment of the apparatus are shown in FIG. 1, namely a reception tank number 20, of size capable of holding the contents of a septic tank 22. A pump 24 powered by the hydraulic unit 26 of a truck 28 creates a vacuum in a pipe 30 and in the reception tank 20. The result of this vacuum is the sucking of the contents 32 of the septic tank by a pipe 34. A second tank 37 containing a polymer solution 36 is supplying, by a pipe 38 and a valve 40, the polymer 36 in a six foot long section 39 of the pipe 34. A valve 43 when opened is permitting the introduction of a constant flow from septic tank 32 into the section 39 whereafter the simultaneous addition of polymer by a valve 40 produces a fixed proportion of the contents of the septic tank 32 mixed with polymer 36.

The mixing of polymer in solution 36 occurs at the same time in section 39 and in reception tank 20, at the arrival of the waste in motion caused by the vacuum of 27 in. Hg produced at the beginning of pipe 30. Once the pumping of the septic tank 22 is over, the valves 43 and 40 controlling the speed of entering of the muds and the polymer should be closed before the beginning of the pushing action of pipe 44. After breaking the vacuum in reception tank 20, the pump 24 builds a pressure in pipe 44 of 8.5 pounds per square inch, for a 500 cfm flow. The pump 24 is of a vacuum type, rotating free blades.

A filter 46 is used in the first step for segregating particles before their introduction in pipe 48. This filter 46 has square openings of ¾". The reception tank 20 is preferably held by a lifting frame 49 to create a funnel for emptying into pipe 48.

The pipe 48 is preferably located at the base of the tank 20 and a valve 50 placed on pipe 48 is used to control the flow of the mix which is to pass above the centrifuge 52, for filling the centrifuge 52 via the opening 54. The centrifuge 52 comprises a first wall partition 56 made of woven cloth and placed vertically and held firmly and concentrically by a superior collar 58 at the top and by an inferior collar 60 at the bottom.

The vertical exterior wall 62 of the centrifuge 52 is preferably perforated . . . 64. The wall 62 is made of steel: its diameter is six feet (6'), its bottom 66 is flat and is also made of steel. The centrifuge 52 is surrounded by a stationary shield 74 containing an opening 68 made in bottom 69 permitting the draining of the liquid, while a pipe 70 permits the return of liquid by gravity to the septic tank 22 or to an auxiliary pump 71. A sprinkler 72 held to an outside wall 74 of the centrifugal unit 52 is placed facing openings 64 in the wall 62. An annular area 76 of 3" gives an access for cleaning, and the space between the cloth 56 and the wall 66 is minimal. A hydraulic motor 78 is actioned by a moving mechanism 26 and a coupling 80 which is engaging the bottom wall 66 of the centrifuge.

The centrifuge 52 is actioned by a hydrostatic system comprising a pump 82 and a hydraulic motor 84 which are imparting rotation movement to the centrifuge 52 in both directions, a speed of 0 to a maximum being achieved by a transmission. A head 86 is mounted on a central shaft 88 with a moveable conical guide 89, the head 86 being used to clean the cloth 56 from the solids 90 produced by the centrifugal action.

Figure 2:
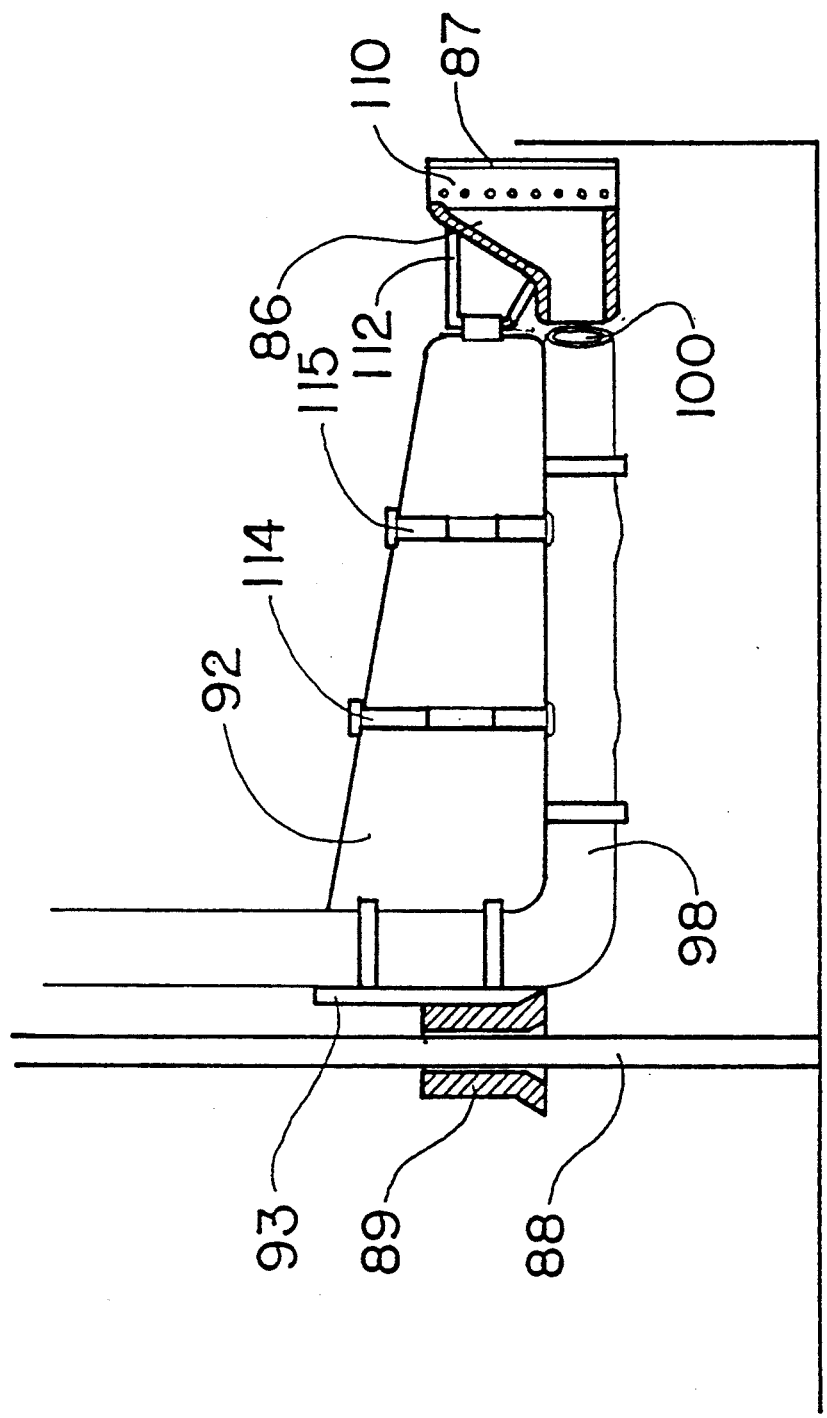
FIG. 2 is a face view of the cleaning unit in the centrifuge.

The cleaning head 86 FIG. 2 comprises a steel funnel and a rubber blade 87; the head is held by a folding arm 92 fixed to the sliding conical guide 89 which is sliding on a cylindrical shaft placed in the middle of the bucket 52; the arm 92 is related . . . 93 . . . to a cross beam 94 held by a post 95 also held hydraulically on the top 96 of centrifuge 52 . . . FIG. 1 . . . . The arm 92 may hold a pipe 98 of which the end 100 is positioned near the head 86. The pipe 98 has diameter of four inches (4") and it can accept the waste made by head 86. These waste coming from the debris 90 are in a first step dried and are sucked in pipe 98 to storage tank 102.

The storage capacity of tank 102 is sufficient for at least twenty septic tanks, once the liquids have been eliminated. Septic tanks usually contain from 2 to 10% solids. An average solid content of 5% indicates that a storage tank 102 equal in size to a septic tank could handle the solid contents of forty (40) septic tanks. The pumping is made by a pump 24 related to a pipe 104. The pipe 104 is related to the pump the same way as the pipe 30. The pipes are permanently connected and have valves control the sequence of operations. The vacuum created by pipe 104 in tank 102 causes the suction by pipe 98 of all matters that are close to entrance 100 and especially waste 90 dismantled by knife 86.

To treat a 900 US gal. septic tank it is preferable to use a pump 24 capable of a suction of 27 in. Hg or of pneumatic transfer of 1200 cubic feet per minute (cfm) of free air. Three minutes is needed to fill up tank 20. Utilize a coagulating polymer 36 in solution, which is injected in the pipe 34 by a valve 40. The polymer 36 and the liquid 32 will be in contact in pipe 39 over a distance of six feet (1.8 m). Then by slowing down the pump 24, turning off the vacuum and closing valve 40, 43 and the valve on pipe 30, a positive pressure of 8.5 psi may be built in pipe 44 to tank 20. Different known means could be used to transfer the use of pump 24 from the production of a vacuum in pipe 30 to the production of a positive pressure in pipe 44. Moreover the tank 20 possesses a high pressure safety valve to cut heavy pressure.

To prevent the presence of large objects in the centrifuge 52, a filter 46 of $\frac{3}{4}$" squares is used. Also tank 20 is adapted to rest on a movable stand to make sure that the solids are drained to exit 48. A sufficient pressure should be provided to elevate the polymerized muds from the bottom of tank 20 up to the top of centrifuge 52, a head of water around eight feet (8') high being needed.

The transfer to centrifuge 52 is made by a four inch (4") diameter pipe 48. The minimal speed 84 of centrifuge 52 is 5 rpm for the cleaning and up to 500 rpm for centrifugal spinning. The centrifuge deposits on its outside face a layer of mud of varying densities the best density being obtained at a speed of around 250 rpm for a diameter of six feet (6'32 m). The height of the centrifuge will be of forty inches (40"51 m) for an approximate volume 700 US gal.

The spinning speed could vary from 200 to 400 rpm, which is considered as a low velocity, but sufficient to give a shovelable mud; if revolutions were lower, such as 100 rpm, the dripping time would be too long and if revolutions were too high (1000 rpm) there would be too much vibration, high cost mechanical problems and security problems from private residences nearby. A high speed is not useful because of the type of muds found in septic tanks, which can dry rapidly.

Dryness, which is the opposite to the percentage of humidity, should be under strict control. Usually, 15 to 20% of dryness gives a mud which is easy to shovel. At 10% there is too much water. At the beginning water runs through the cloth and the perforated wall until the mud completely cover the cloth; then the water runs through the mud. The polymerized particles build a vortex of parabolic shape 90 in centrifuge 52. The centrifuge is opened at the top for allowing to look at the mud during the spinning and after. At the end if the mud looks shiny, it means there is water in it and if the mud is flat there no water in it: it means the end of the spinning cycle.

To reach the goal of a good degree of dryness, the spinning cycle time should be of four to five minutes after which time the mud sticks to the wall and could be shoveled. The operator should check if the mud is shiny or flat, and if it looks appropriate, the operator stops the centrifuge, then he slows the rotation to a speed consistent with the rate of cleaning which is achievable, about one (1) to ten (10) rpm, 3 rpm causing a displacement of $3\pi6$ ft/min., or one ft/sec.

Referring now to FIG. 2, before cleaning, an arm 92 is lowered in centrifuge, and is guided by a sliding sleeve 89, which positions the arm centrally. A head 86 with a rubber scraper 87 which may optionally be provided with teeth, placed at the end of the arm 92 passes very close to the cloth when cleaning it. The head supports the extremity 100 of an aspiration pipe 98 which catches and transfers immediately by vacuum and/or by pneumatic transfer the particules collected from the cloth by the cleaning arm. A suction volume of 1200 cfm gives a travel speed in a 4" pipe, of 1200 cfm × 1728 cu.in./cu.ft. = 1200 × 1728/60 cu.in./sec × area "A" sq.in. × speed "V" in./sec.

Area "A" of 4" pipe $= \pi 4^2/4 = 4\pi$ in. sq.

Flow of 1200/60 × 1728 cu. in./sec $= 4\pi$ in. sq. × $V$ in/sec $$V = \frac{20 \times 1728}{4\pi} \text{ in./sec} = \frac{5 \times 1728}{\pi \times 12} \text{ ft/sec} =$$

$$230 \text{ ft/sec} = 150 \text{ mph}$$

The cake 90 is a paste which is removed at the entrance of the head by knifes operating at an angle and at a speed of aspiration of 150 mph. At that speed few plugs are made, and if any are made the speed decreases, the vacuum force increases and the plug is disintegrated and aspirated through the pipe. Even when the degree of dryness is high the vacuum force breaks the lumps. To wring muds to a dryness of 30% would be a waste of cycle time because only a level of 17 to 23% of dryness is necessary as a level of 15 to 17% is the level where mud transforms from a liquid state to a state where it may be shoveled.

The head 86 . . . FIG. 2 . . . comprises a support 112 made of steel, and is holding a rubber scraper 87. The head is attached to a folding arm which folds in three around pivots 114 and 115 while the spinning occurs and spreads out for the scraping cycle. The rubber 87 is used for its flexibility and to prevent the ripping of the cloth 56. The mud goes to the storage tank 102, which is also provided with a pivot for facilitating dumping from the truck platform level.

The rinsing of the centrifuge is provided by a pressurized tank 116 which is supplying fresh water to sprinklers 72 to spray water directly onto the openings 64 of wall 62, from the outside towards the inside of centrifuge 52 and opposite to the spinning direction. The cloth 56 may be used or not, depending on the type of mud to treat: it is held in place by two collars 58 and 60 which may be removed.

The piping size is not limited to 4" but normally varies from 2 to 8".

The polymers in use may generally be obtained on the local market although the quantity and type may be varied to obtain different degrees of flocculation.

The centrifugal unit is provided with a pierced wall which allows at any time the dripping of a quantity of fluid matter even before the start of the wringing cycle and therefore may be of a lesser capacity than the first storage tank. As for the speed of revolution we prefer to maintain a speed of 270 rpm for a six (6) ft. diameter. To apply a corresponding speed to different diameters, for particular needs, we have developed a constant "m" such that "m"=speed (rpm)×√diameter (ft)=660. The value of "m" is affected slightly by types of mud and polymer and may vary in certain applications from 450 to 900.

The preferred embodiment heretofore described does not preclude other methods inferred in the appended claims:

I claim:

1. A mobile unit for the treatment of septic tanks containing a slurry of liquid with suspended particles, said mobile unit being of the type having a series of reservoirs and comprising a centrifugation unit mounted thereon, said mobile unit comprising:
   pumping means for pumping said slurry, said pumping means comprising piping means to draw said slurry from a septic tank;
   a first reservoir for temporary storage of said pumped and piped slurry;
   treating means for causing the coagulation of said solid particles in said slurry;
   centrifuging means comprising a vertical and cylindrical bucket comprising a bottom, a perforated vertical wall and means attached to said bucket for effecting the rotation of said bucket on its vertical axis, thereby causing the deposit of said coagulated particles on said perforated wall and the flow of said liquid through said perforated wall thereby causing the separation of said liquid from said coagulated particles;
   removal means for removing said deposit of coagulated particles from said perforated wall, said removal means comprising a retractable arm mounted on a central column mounted in the center of said bucket, said retractable arm being slidable up and down said column, said retractable arm being moveable between a first retracted position during centrifuging and second extended position close to said perforated wall, when said bucket is rotated at a speed for cleaning said perforated wall, said retractable arm comprising:
   scraper means for removing said coagulated particle deposit from said perforated wall; and
   suction means, positioned near said scraper, for catching the removed coagulated particle deposits;
   a second reservoir for storage of said removed coagulated particles;
   transportation means for moving said removed coagulated particles from said suction means to said second storage reservoir;
   cleaning means for cleaning said perforated wall;
   said pumping means also including piping means for returning said separated liquid back to said septic tank.

2. The mobile unit of claim 1 wherein said unit is mounted on a motorized vehicle.

3. The mobile unit of claim 2 wherein said motorized vehicle is a truck.

4. The mobile unit of claim 1 wherein said first reservoir is of equivalent capacity to that of a septic tank.

5. The mobile unit of claim 1 wherein said treating means includes means for injecting a polymer solution into said piping means thereby causing the coagulation of said suspended particles.

6. The mobile unit of claim 1 wherein said suction means is a suction pipe activated by said pumping means, said suction pipe being mounted on said retractable arm and having an inlet positioned below said scraper.

7. The mobile unit of claim 1 wherein said centrifuging means comprises a web of woven material placed, inside said bucket, on the perforated wall, and said cleaning means for cleaning said perforated wall including liquid sprinkling means installed outside said bucket to continuously spray the outside surface of said perforated wall, thereby spraying and cleaning said perforated wall and said woven material.

8. A method for treating, with mobile equipment, a septic tank containing a slurry of liquid with suspended particles, to separate and remove said solid particles therefrom, the method comprising the steps of:
   (a) drawing said slurry from said septic tank into a first temporary storage reservoir;
   (b) treating said slurry with a coagulation agent to cause the coagulation of said solid particles into coagulated particles;
   (c) centrifuging the treated slurry in a vertical and cylindrical centrifugal bucket comprising a bottom, a perforated vertical wall and means attached to said bucket for effecting the rotation of said bucket on its vertical axis, thereby causing the deposit of said coagulated particles on said perforated wall and the flow of said liquid through said perforated wall thereby causing the separation of said liquid from said coagulated particles;
   (d) removing said deposit of coagulated particles from said perforated wall with a retractable arm mounted on a central column mounted in the center of said bucket, said retractable arm slidable up and down said column, said retractable arm moveable between a first retracted position during centrifuging and a second extended position close to said perforated wall, when said bucket is rotated at a speed for removing said coagulated particles from said perforated wall, said retractable arm comprising:
   scraper means for removing said coagulated particle deposit from said perforated wall; and
   suction means positioned near said scraper for catching the removed coagulated particle deposit;
   (e) transporting said removed coagulated particles from said suction means to a second storage reservoir;
   (f) cleaning said perforated wall; and (g) pumping said separated liquid back to said septic tank.

9. A mobile unit for the treatment of septic tanks containing a slurry of liquid with suspended particles, said mobile unit comprising:

pumping means for pumping slurry, said pumping means including piping means for drawing slurry from a septic tank;

a first reservoir in fluid communication with said pumping means and providing means for temporarily storing slurry pumped by said pumping means;

treating means for causing the coagulation of solid particles in the slurry;

centrifuging means for separating liquid from coagulated particles, said centrifuging means including a cylindrical bucket having a bottom, having a perforated wall extending vertically from said bottom, and having a vertical axis, and said centrifuging means further including means attached to said bucket for rotating said bucket on its vertical axis, thereby causing the deposit of coagulated particles on said perforated wall and causing the flow of liquid through said perforated wall;

removal means for removing the deposit of coagulated particles from said perforated wall, said removal means including a central column mounted in the center of said bucket, and a retractable arm mounted on said central column, said retractable arm being slidable up and down said column, said retractable arm being moveable between a first retracted position during centrifuging and second extended position close to said perforated wall when said bucket is rotated at a speed for cleaning said perforated wall, said retractable arm including scraper means for removing said coagulated particle deposit from said perforated wall, and said removal means further including suction means, positioned near said scraper, for catching the removed coagulated particle deposit;

a second reservoir for storing said removed coagulated particles;

transportation means for moving said removed coagulated particles from said suction means to said second reservoir; and cleaning means for cleaning said perforated wall;

said pumping means also including piping means for returning separated liquid back to the septic tank.

* * * * *